United States Patent
Hosch et al.

(10) Patent No.: US 7,681,719 B2
(45) Date of Patent: Mar. 23, 2010

(54) SANITARY CONVEYOR TRANSFER TAIL ASSEMBLY

(75) Inventors: Michael A. Hosch, Oconomowoc, WI (US); Scott M. Hall, Sussex, WI (US); Daniel E. Ertel, Oconomowoc, WI (US)

(73) Assignee: Dorner Mfg. Corp., Hartland, WI (US)

( * ) Notice: Subject to any disclaimer, the term of this patent is extended or adjusted under 35 U.S.C. 154(b) by 0 days.

(21) Appl. No.: 11/186,739

(22) Filed: Jul. 21, 2005

(65) Prior Publication Data

US 2007/0017786 A1    Jan. 25, 2007

(51) Int. Cl.
*B65G 21/00* (2006.01)
*B65G 21/06* (2006.01)

(52) U.S. Cl. .................. 198/861.1; 198/841; 198/860.2
(58) Field of Classification Search ................. 198/841, 198/860.1, 861.1, 861.2, 831, 860, 837
See application file for complete search history.

(56) References Cited

U.S. PATENT DOCUMENTS

| | | | |
|---|---|---|---|
| 5,174,435 A | | 12/1992 | Dorner et al. |
| 5,605,222 A | * | 2/1997 | Huberty et al. ............. 198/841 |
| 6,109,427 A | | 8/2000 | Hosch et al. |
| 6,209,715 B1 | * | 4/2001 | Eltvedt ........................ 198/813 |
| 6,227,355 B1 | * | 5/2001 | White et al. ................. 198/841 |
| 6,298,981 B1 | | 10/2001 | Hosch et al. |
| 6,367,619 B1 | * | 4/2002 | Cemke et al. ................ 198/841 |
| 6,371,283 B1 | * | 4/2002 | Manchester .................. 198/816 |
| 6,422,362 B1 | * | 7/2002 | Schmidt et al. ............. 188/339 |
| 6,422,382 B1 | * | 7/2002 | Ertel et al. ............... 198/860.1 |
| 6,427,831 B1 | * | 8/2002 | Norton ....................... 198/841 |
| 6,523,679 B1 | * | 2/2003 | Manchester .................. 198/841 |
| 6,685,009 B1 | * | 2/2004 | Hosch et al. ................ 198/813 |
| 6,871,737 B2 | * | 3/2005 | Ertel et al. ............... 198/860.1 |

\* cited by examiner

*Primary Examiner*—Gene Crawford
*Assistant Examiner*—Kavel P Singh
(74) *Attorney, Agent, or Firm*—Andrus, Sceales, Starke & Sawall, LLP

(57) ABSTRACT

A transfer tail assembly for use with a conveyor assembly that creates a reduced radius transition from the upper run to the lower run of a continuous conveyor belt used with the conveyor assembly. The transfer tail assembly includes a stationary nose bar over which the continuous conveyor belt passes at the end of the conveyor assembly. The nose bar is supported at the end of the conveyor assembly by a series of support brackets mounted to a cross support. Each of the support brackets is formed from a wear resistant material and contacts the conveyor belt as the conveyor belt passes around the transfer tail assembly. The nose bar, support brackets and cross support are mounted within the tail assembly without the use of any external connectors and thus require no tooling to assemble and disassemble.

16 Claims, 4 Drawing Sheets

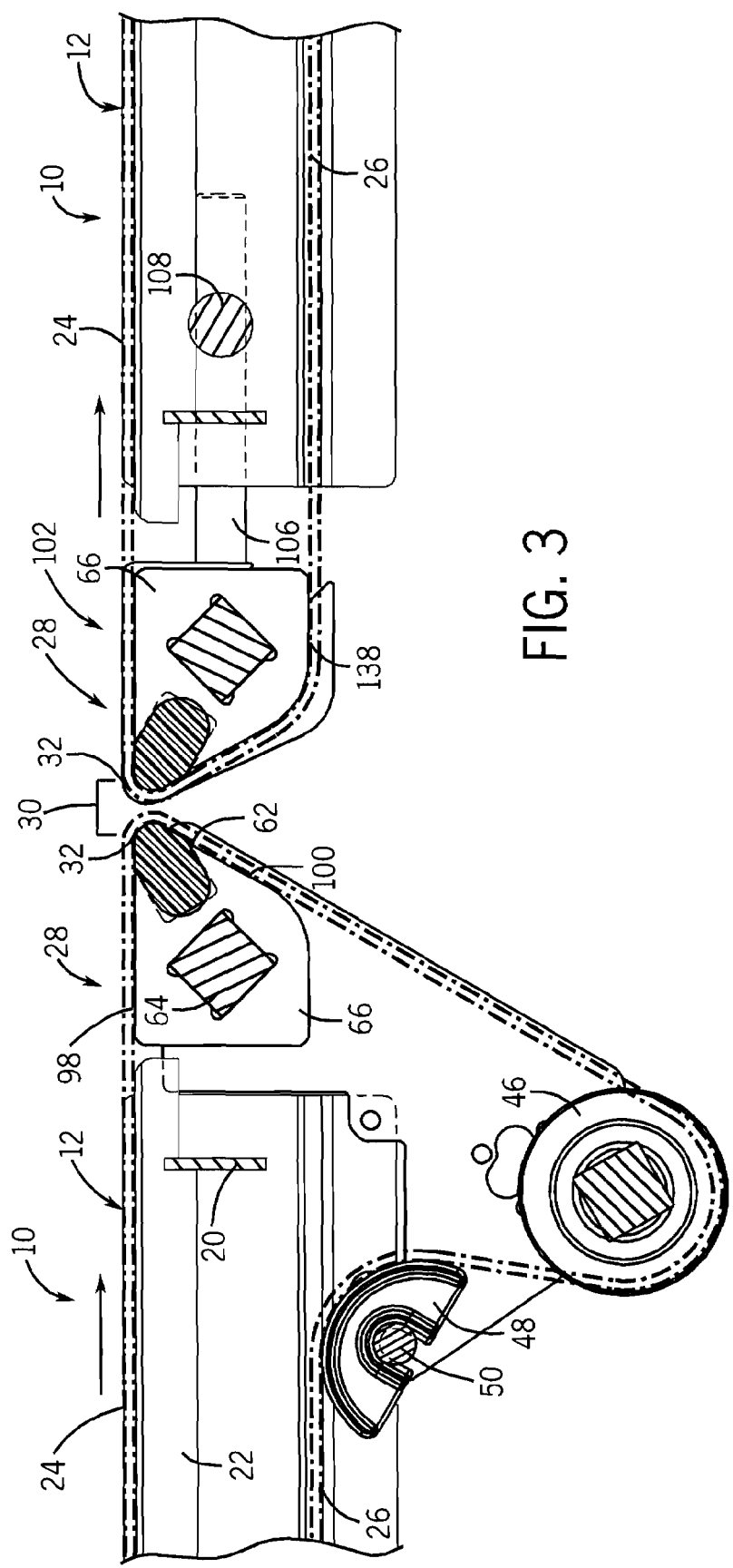

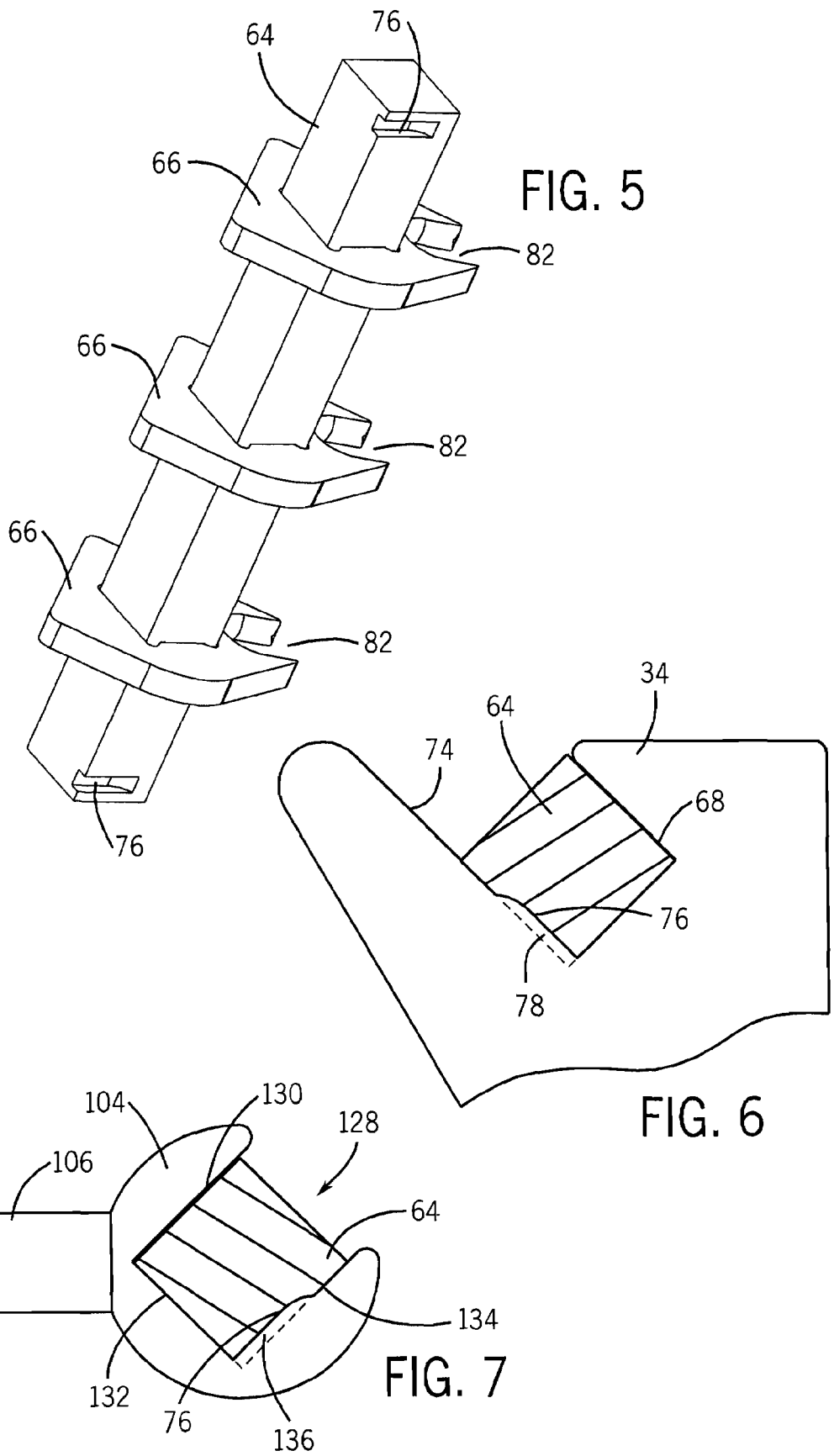

SANITARY CONVEYOR TRANSFER TAIL ASSEMBLY

BACKGROUND OF THE INVENTION

The present invention generally relates to a transfer tail assembly for a conveyor that is particularly useful in a sanitary environment. More specifically, the present invention relates to a transfer tail assembly that includes a reduced radius transfer point between the upper and lower runs of a continuous conveyor belt and can be completely disassembled for cleaning without the use of any tools.

Presently, in food processing conveyor applications, conveyors must be manufactured such that the conveyor belt can be removed and the entire conveyor frame assembly sanitized. Following sanitation, the conveyor belt must be reinstalled for continued operation. Numerous guidelines exist to regulate the type of conveyor assembly that be used in a sanitary environment, such as in a food processing facility. Typically, these guidelines require that the conveyor frame assembly must be capable of being disassembled and sanitized. Since the conveyor frame assembly must be sanitized on a regular basis, the conveyor assembly must be capable of being quickly disassembled to allow complete cleaning. Preferably, the disassembly should require no tools.

The food processing guidelines for conveyors also require that the conveyors not include any areas that collect water after the conveyor has been washed down. If the conveyor includes areas that collect water, bacteria can form in the wet areas, which is unacceptable in a sanitary environment. Therefore, the conveyors used in the food processing industry must be sealed and prevent water from pooling after the conveyor assembly has been washed down.

In many uses of sanitary conveyors, the conveyors transport relatively small articles or food products. A significant problem exists at the intersection of two conveyor sections when transferring relatively small articles. Typically, each conveyor section includes an end roller that directs the continuous conveyor belt between the upper and lower runs. As an article passes over the end roller, the article is transferred from a first conveyor assembly to a second assembly positioned adjacent to the first conveyor assembly. The radius of the end roller on each conveyor assembly creates a dead space between the conveyor assemblies where articles being transferred can become lodged.

In a typical conveyor frame assembly, the radius of the end roller can be reduced to shorten the gap between the conveyor frame assemblies. However, in a sanitary conveyor application, the entire end roller assembly must be able to be taken apart and reassembled without any additional toolings.

Therefore, it is desirable to provide a transfer tail assembly that includes a small diameter transfer radius while providing a transfer tail that can be completely assembled and disassembled without the use of any tooling. Further, it is desirable to provide a conveyor assembly that includes a sealed frame that prevent water from collecting and pooling after the conveyor has been washed.

SUMMARY OF THE INVENTION

The present invention is a transfer tail assembly for use with a conveyor assembly that includes a conveyor belt supported between a pair of spaced side frame members. The conveyor assembly extends from a first end to a second end and the transfer tail assembly can be utilized on one or both ends of the conveyor assembly.

The transfer tail assembly includes a pair of side brackets each mounted to one of the side frame members of the conveyor assembly. In a first embodiment of the invention, each of the side brackets is fixed to one of the side frame member of the conveyor assembly. In a second, alternate embodiment, the side brackets are movable relative to the stationary side frame members.

Each of the side brackets includes a support notch that receives one end of a cross support member of the transfer tail assembly. Each end of the cross support member includes a retaining slot such that the spaced side brackets engage the retaining slots to prevent the lateral movement of the cross support relative to the longitudinal axis of the conveyor assembly. The slidable engagement between the cross support and side brackets also prevents rotation of the cross support relative to the side brackets.

The cross support receives a plurality of support brackets that are each movable along the longitudinal length of the cross support. Specifically, each of the support brackets includes an access opening that is sized to receive the generally square outer surface of the cross support. The mating configuration of the access opening on the support brackets and the outer surface of the cross support prevents the support brackets from rotating about the longitudinal axis of the cross support.

Each of the support brackets includes a receiving channel sized to receive and support a portion of a nose bar. Specifically, the nose bar includes multiple receiving slots, each of which engage the receiving channel formed in one of the support brackets. The series of support brackets provides support for the nose bar while allowing the nose bar to be removed and replaced without any external tooling requirements. The nose bar extends from the cross support and is strengthened and stabilized by the series of spaced support brackets such that the nose bar remains stable as the conveyor belt passes over the transfer tail assembly.

In the preferred embodiment of the invention, both the nose bar and the series of support brackets are formed from a wear resistant material, such as UHMW plastic. Since both the support brackets and the nose bar contact the moving conveyor belt, the material used to form these components must be able to withstand constant wear while not damaging the moving conveyor belt.

The entire transfer tail assembly can be installed and disassembled without the requirement of any external tooling. Specifically, the cross support slides into the pair of spaced side brackets. Likewise, each of the support brackets are movable along the length of the cross support and include a receiving channel that receives the nose bar. The nose bar can be removed from the support brackets without the requirement of any external tooling.

The nose bar included as a portion of the transfer tail assembly includes a curved contact surface over which the conveyor belt passes. The radius of the contact surface defines the transition between the upper and lower runs of the conveyor belt. The contact surface has a sufficiently small radius to reduce the gap between two adjacent sections of the conveyor assembly. The nose bar is a stationary member formed from a wear resistant material, such as UHMW plastic.

BRIEF DESCRIPTION OF THE DRAWINGS

The drawings illustrate the best mode presently contemplated of carrying out the invention. In the drawings:

FIG. 3 is a section view of a pair of conveyor assemblies positioned adjacent to each other;

FIG. 5 is a perspective view of the cross support and support brackets that form a portion of the transfer tail assembly;

FIG. 6 is a section view illustrating the engagement between one of the side brackets and the cross support of the first embodiment of the transfer tail assembly; and FIG. 7 is a section view illustrating the engagement between one of the side brackets and the cross support of the second embodiment of the transfer tail assembly.

DETAILED DESCRIPTION OF THE PREFERRED EMBODIMENT

Figure 1:
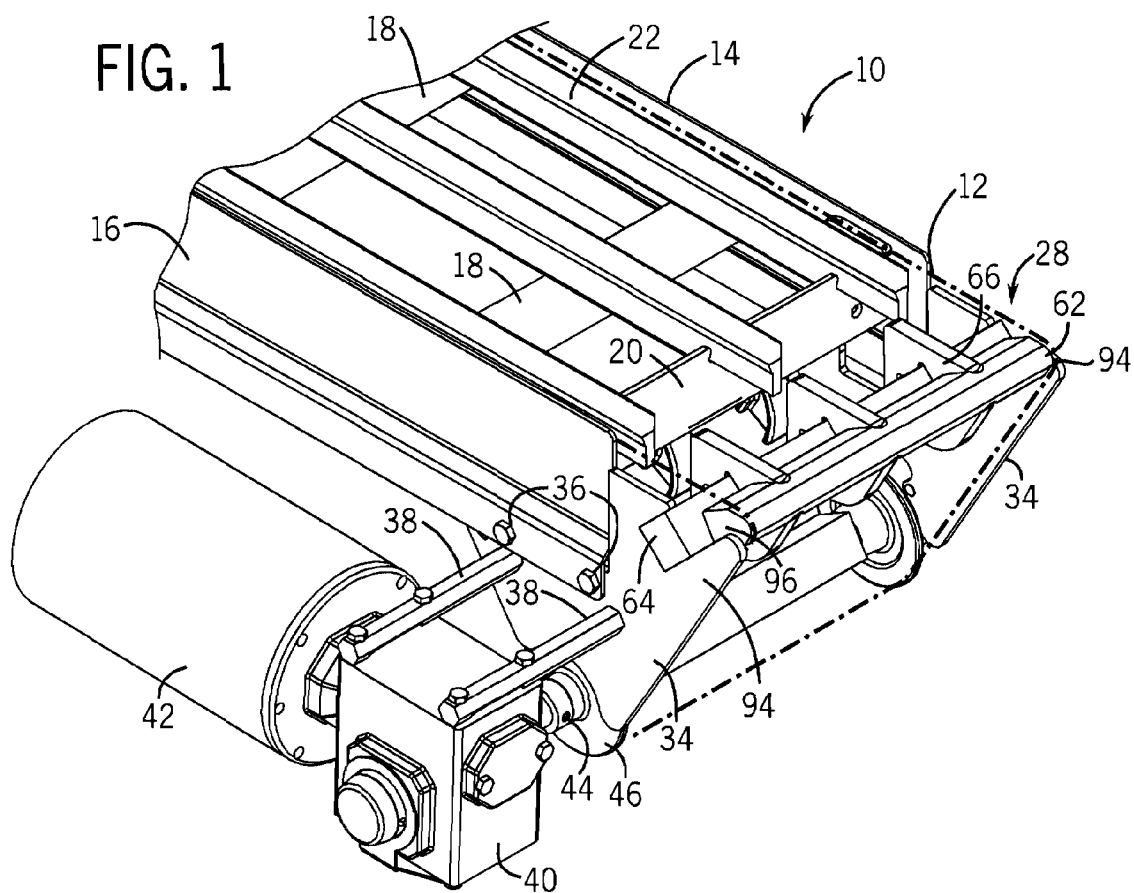
FIG. 1 is a perspective view of a conveyor assembly including the transfer tail assembly of the present invention.

FIG. 1 illustrates a conveyor assembly 10 that includes a continuous conveyor belt used to transport articles. The conveyor assembly 10 includes a pair of side frame members 14,16 spaced from each other by the width of the conveyor belt 12. The side frame members 14,16 are joined by a series of cross members 18 and rail supports 20. The rail supports 20 receive and support a series of spaced slide rails 22 that provide support for the upper run of the conveyor belt 12.

As best illustrated in FIG. 3, the continuous conveyor belt 12 defines an upper run 24 and a lower run 26. In the embodiment of the invention as illustrated, the continuous conveyor belt 12 is formed from plastic links, such as sold by Intralox, LLC. The continuous conveyor belt 12 is particularly useful in a sanitary conveyor since the plastic links of the conveyor belt 12 can be easily sanitized and inhibit the growth of bacteria. However, the invention can be utilized with other types of conveyor belts other than belts formed from interlocking plastic links.

The transition from the upper run 24 to the lower run 26 occurs over a transfer tail assembly 28. As shown in FIG. 3, when two separate conveyor assemblies 10 are positioned adjacent to each other, a gap 30 is created between the transition points 32 between the upper and lower runs of each conveyor belt. If the conveyor assemblies 10 are used to transport relatively small articles, the size of the gap 30 must be less than the width of the article to prevent the article from becoming lodged within the gap 30. Thus, as can be understood in FIG. 3, the transfer tail assembly 28 is designed to have a relatively small radius at the transition point 32 between the upper run 24 and lower run 26 of the conveyor belt 12.

Referring back to FIG. 1, the transfer tail assembly 28 of the first embodiment of the invention includes a pair of spaced side brackets 34 that are each attached to one of the side frame members 14,16 of the conveyor assembly 10. In the embodiment of the invention illustrated, each of the side brackets 34 are attached to one of the side frame members 14,16 by a pair of bolts 36. The side brackets 34 receive a pair of mounting rails 38 that support a gear box 40 and an associated drive motor 42. The gear box 40 receives a shaft 44 that supports a series of spaced drive sprockets, not shown.

As can be seen in FIG. 3, the conveyor belt 12 passes over the outer surface of the drive sprockets (not shown) such that the drive sprockets impart the driving force required to move the continuous conveyor belt 12.

Figure 2:
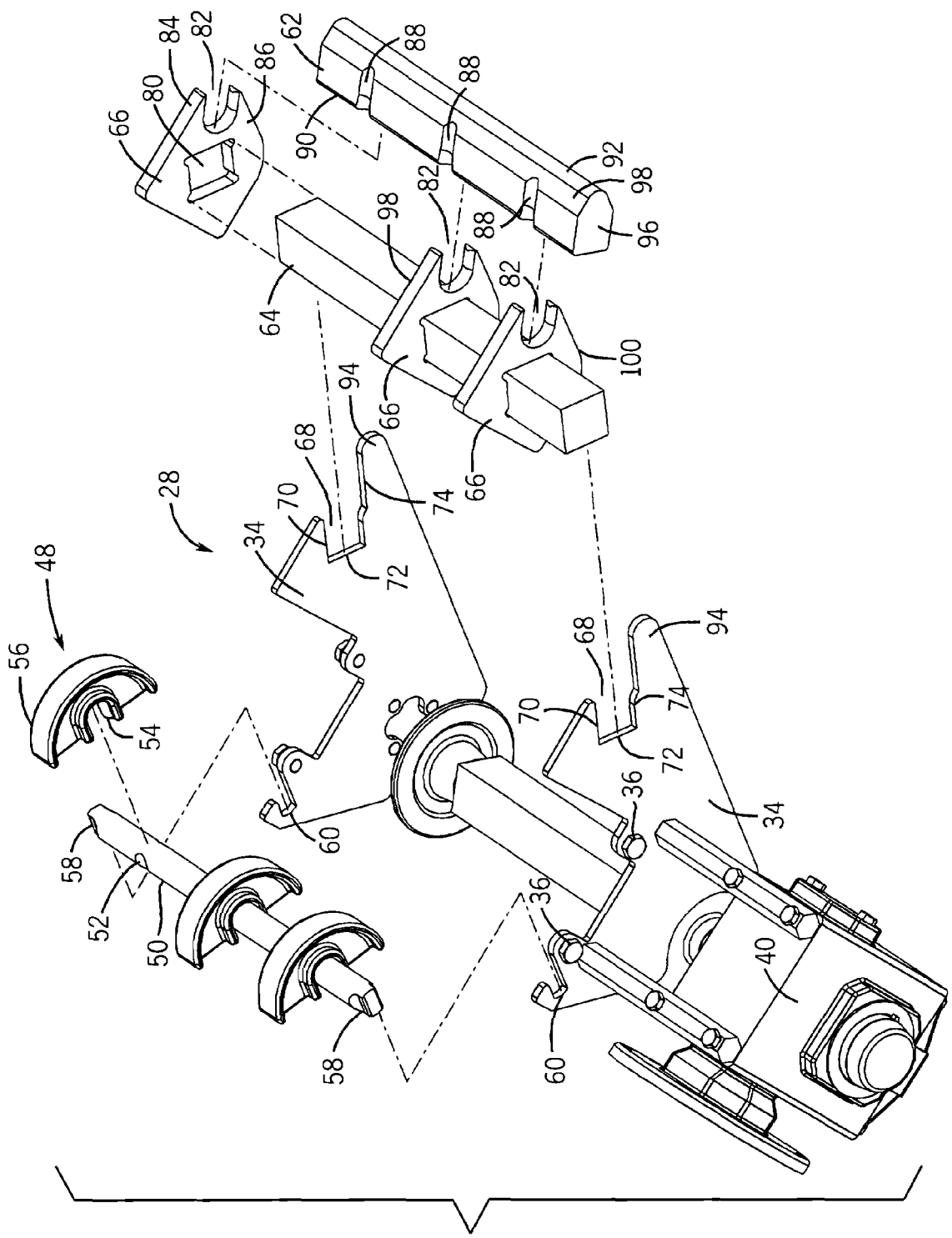
FIG. 2 is an exploded view of the first embodiment of the transfer tail assembly.

The conveyor belt 12 passes over a series of curved idler supports 48 spaced along a shaft 50. As can be seen in FIG. 2, the shaft 50 includes a series of spaced notches 52 that each receives a corresponding tab 54 on the idler support 48 to prevent the lateral movement of the idler support 48 along the longitudinal length of the shaft 50.

Each of the idler supports 48 includes a smooth, outer contact surface 56 that contacts and supports the lower run of the conveyor belt. Preferably, each of the idler supports 48 is formed from UHMW plastic to provide the required durability and low friction required to support and contact the moving conveyor belt. The contact surface 56 has a radius that aids in the transition of the conveyor belt 12 from the drive sprockets to the generally horizontal lower run 26, as shown in FIG. 3.

Referring back to FIG. 2, the shaft 50 has a generally circular cross section and includes a generally flat engagement portion 58 on each of its spaced ends. The engagement portion 58 on each end of the shaft 50 is slidably received within a shaft engagement slot 60 formed as part of the side bracket 34. As can be understood in FIG. 2, the engagement portion 58 on each end of the shaft 50 allows the shaft 50 to slide into the shaft engagement slots 60. The generally flat shape of the engagement portions 58 and the shape of the shaft engagement slots 60 prevent the shaft 50 from rotating once inserted into the side brackets 34.

Referring back to FIG. 3, the movement of the conveyor belt 12 over the spaced idler supports 48 exerts a force against the shaft 50 that presses the shaft into the shaft engagement slot 60 (FIG. 2). Thus, during operation of the conveyor assembly, the force exerted by the moving conveyor belt 12 hold the shaft 50 within the shaft engagement slots 60. However, when the conveyor belt 12 is removed, the shaft 50 can be simply slid out of the shaft engagement notches 60 without the use of any additional tooling. Additionally, each of the idler supports 48 can be removed from the shaft 50 by simply pulling the idler support 48 from the shaft 50 without the requirement of any additional tooling.

Referring back to FIGS. 1 and 2, the transfer tail assembly 28 includes a nose bar 62 that defines the transition point from the upper run to the lower run of the conveyor belt. The nose bar 62 is supported between the pair of side brackets 34 by the combination of a cross support 64 and a plurality of support brackets 66. In a contemplated embodiment of the conveyor assembly, the conveyor belt can have a width of up to fifty feet and, in some cases, may be traveling at speeds of up to 100 ft/min. Because of the forces asserted against the nose bar 62 by the conveyor belt 12 during operation of the conveyor assembly 10, the nose bar 62 must be securely supported across the entire width of the conveyor belt 12. Further, it is desired that the nose bar 62 be easily removable for replacement without requiring any tooling. Since the nose bar 62 continuously contacts the moving conveyor belt 12 at the relatively high friction transition point, the nose bar 62 is subject to wear and relatively frequent replacement.

Referring now to FIG. 2, the cross support 64 is slidably received within a support notch 68 formed in each of the side brackets 34. Each of the support notches 68 includes a top wall 70, a back wall 72 and a bottom wall 74. As illustrated in FIG. 2, the cross support 64 has a generally square shaped cross section and is received within the support notches 68 which also have a generally square shape. As can be understood in FIG. 2, the cross support 64 can be slid into the support notches 60 such that the top wall 70, back wall 72 and bottom wall 74 prevent the cross support 64 from rotating about its longitudinal length. The interaction between the back wall 72 and the outer surface of the cross support 64 provides stability for the cross support 64 while the open end of each of the support notches 68 allows the cross support 64 to be removed without requiring any tools.

Referring now to FIG. 5, the cross support 64 includes a retaining slot 76 formed on each of its ends. The retaining slots 76 are spaced slightly inward from each outer end of the cross support 64. As illustrated in FIG. 6, each of the support notches 68 formed in the side bracket 34 includes a tab 78 that extends from the bottom wall 74. As shown in FIG. 6, the tab 78 is received within the retaining slot 76 when the cross support 64 is slid into the support notches 68. The interaction between the tab 78 and the retaining slot 76 prevents the lateral movement of the cross support 64 relative to the longitudinal axis of the conveyor assembly 10. As can be easily understood in FIG. 2, the cross support 64 can be removed from between the side brackets 34 without any additional tooling and is held in place by the force of the conveyor belt passing over the nose bar 62. In the preferred embodiment of the invention, the cross support 64 is formed from stainless steel to provide the required rigidity to support the nose bar 62.

Referring back to FIG. 2, the transfer tail assembly 28 includes a plurality of support brackets 66 spaced along the longitudinal length of the cross support 64. Each of the support brackets 66 includes an access opening 80 that receives the cross support 64. In the embodiment of the invention illustrated, the access opening 80 has a generally square shape that is sized to contact the outer surfaces of the cross support 64. The size of each access opening 80 allows each of the support brackets 66 to be freely movable along the longitudinal length of the cross support 64. When each of the support brackets 66 are in the desired position, the square shape of the access opening 80 prevents the support bracket 66 from rotating about the longitudinal access of the cross support 64.

In the preferred embodiment of the invention, support brackets 66 are formed form a UHMW plastic material having the required strength to support the nose bar 62. The plastic UHMW material is particularly desirable when the conveyor assembly is used in a food processing application, since the UHMW material provides low friction, durability and can be easily sanitized. Each of the support brackets 66 includes a receiving channel 82 defined by a top finger 84 and a bottom finger 86.

As illustrated in FIG. 2, the nose bar 62 includes a plurality of spaced receiving slots 88 that extend generally from the back surface 90 toward the curved outer contact surface 92. The receiving slots 88 are spaced along the length of the nose bar 62 and are sized to be received within the receiving channels 82 formed in each of the support brackets 66. As can be understood in FIG. 2, the nose bar 62 is slid into each of the spaced support brackets 66 and is retained within the respective receiving channels 82. However, the nose bar 62 can be easily removed from the support brackets 66 without any tooling by simply moving the nose bar 62 outward from the respective receiving channels 82.

Referring back to FIG. 1, when the nose bar 62 is mounted to the plurality of support brackets 66, the nose bar 62 is positioned between the extending fingers 94 formed as a portion of each of the side brackets 34. The interaction between the outer end surfaces 96 of the nose bar 62 and the fingers 94 restricts the lateral movement of the nose bar 62 relative to the longitudinal axis of the conveyor assembly 10. Further, the pressure exerted by the moving conveyor belt 12 presses the nose bar 62 into the receiving channels formed by each of the support brackets 66. When the conveyor belt 12 is removed, the nose bar 62 can be removed and replaced by simply sliding the nose bar 62 out of the spaced support brackets 66. Thus, the nose bar 62 can be removed and replaced without any external tools.

Referring back to FIG. 2, the contact surface 92 of the nose bar 62 defines the transition radius from the upper run of the conveyor belt to the lower belt of the conveyor belt. On each side of the contact surface 92 is a lead-in surface 98 that aids in directing the conveyor belt around the contact surface 92. In the preferred embodiment of the invention, the nose bar 62 is formed from a UHMW plastic material that provides both low friction for the moving plastic conveyor belt and is sufficiently wear resistant.

Referring back to FIG. 3, the nose bar 62 is a stationary member that allows the conveyor belt 12 to transition from the upper run 28 toward the lower run. As the conveyor belt transitions over the nose bar 62, the conveyor belt contacts both the top surface 98 and the front face surface 100 of each support bracket 66. Since each of the support brackets 66 is formed from UHMW plastic, the plastic material reduces the amount of wear on the moving conveyor belt 12. Further, since each of the support brackets 66 are subject to wear, the support bracket 66 can be easily removed by sliding the support brackets 66 off of the cross support 64 in the manner discussed previously.

In the embodiment of the invention illustrated in FIGS. 1-3, the transfer tail assembly 28 is shown in an embodiment used at the drive end of the conveyor assembly 12. Specifically, the transfer tail assembly 28 includes side brackets 34 that support both the gear box 40 and the drive motor 42. In the embodiment illustrated, the entire transfer tail assembly 28 is stationary.

Figure 4:
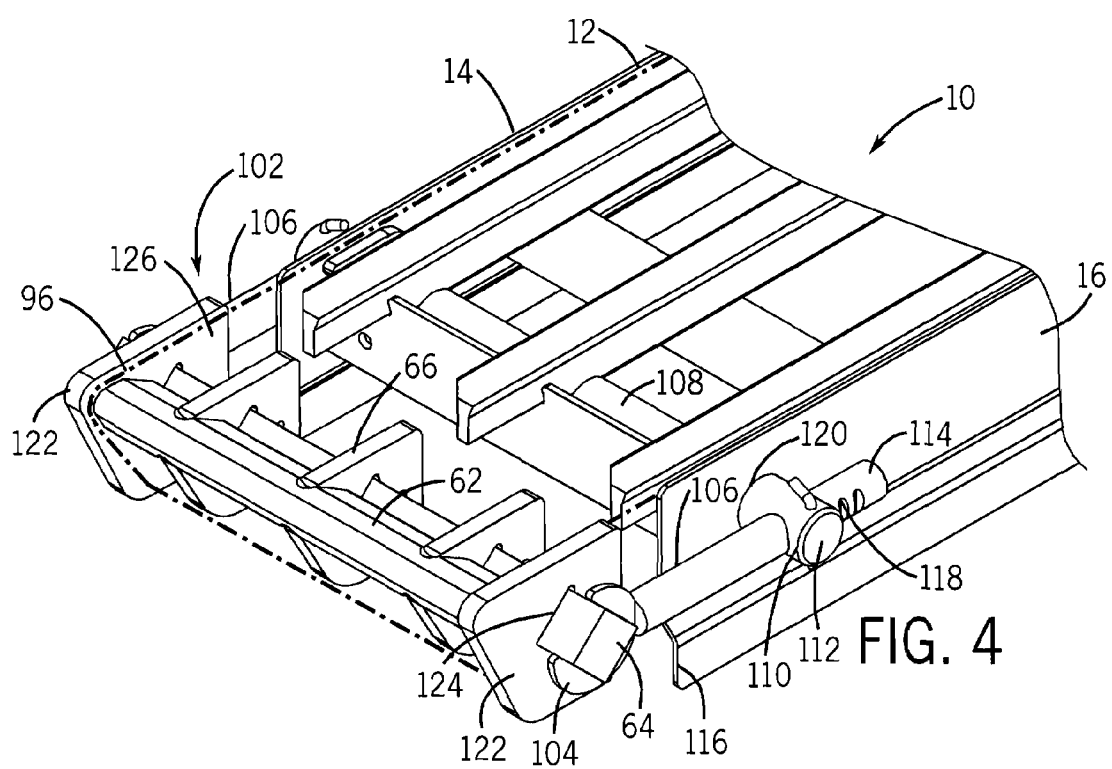
FIG. 4 is a perspective view of a second embodiment of the transfer tail assembly.

Referring now to FIG. 4, thereshown is a second embodiment of the transfer tail assembly 102 that can be used on the opposite end of the conveyor assembly 10. The transfer tail assembly 102 includes most of the same components as the transfer tail assembly 28 and like reference numerals are used to identify the components.

As illustrated in FIG. 4, the transfer tail assembly 102 includes the nose bar 62 supported by the plurality of spaced support brackets 66 along the cross support 64. However, the transfer tail assembly 102 includes side brackets 104 each mounted to a side arm 106. Each of the side arms 106 extends through an axle 108. Axle 108 extends across the width of the conveyor assembly 10 through both of the side frame members 14,16. The axle 108 includes a bore 110 near each of its outer ends 112 that allows the respective side arm 106 to extend therethrough. The back end 114 of each side arm 106 extends past the axle 108 and allows the side arms 106 to move generally along the longitudinal axis of the conveyor assembly 10. The movement of the side arms 106 relative to the axle 108 allows the distance of the nose bar 62 from the second end 116 of the conveyor assembly to be adjusted. The adjustment of the distance from the nose bar 62 to the second end of the conveyor assembly allows the transfer tail assembly 102 to adjust the tension in the conveyor belt 12.

Each of the side arms 106 includes a series of adjustment notches 118 that are engaged by a locking pin 120 that extends through a hole included within the outer end 112 of the axle 108. The engagement between the locking pin 120 and one of the adjustment notches 118 restricts the movement of the transfer tail assembly 102 along the longitudinal axis of the conveyor assembly 10 when the transfer tail assembly 102 is in its desired position.

Referring now to FIG. 4, the transfer tail assembly 102 includes a pair of side plates 122 received along the length of the cross support 64. Each of the side plates 122 is supported by the cross support 64 in addition to the plurality of support brackets 66. Each side plate 122 includes an access opening 124 sized to receive the outer surface of the cross support 64. The side plates 122 have a size slightly larger than the support brackets 66 and include an inner surface 126 that engages the outer end surfaces 96 of the nose bar 62 to restrict the lateral movement of the nose bar 62. In the preferred embodiment of the invention, each of the side plates 122 is formed from a UHMW plastic material.

Referring now to FIG. 7, the side bracket 104 includes a support notch 128 defined by a top wall 130, a back wall 132 and a bottom wall 134. The bottom wall 134 includes an extending tab 136 that is received within the retaining slot 76 formed in the cross support 64. As in the first embodiment, the tab 136 restricts the lateral movement of the cross support 64 relative to the longitudinal axis of the conveyor assembly 10. Referring now to FIG. 3, the transfer tail assembly 102 does not include the drive roller and thus the lower run 26 of the conveyor belt contacts the bottom surface 138 of each support bracket 66.

As can be understood in the drawings and description, the entire transfer tail assembly 28 or 102 can be assembled and disassembled without the use of any external tools. Thus, the conveyor assembly including the transfer tail assemblies 28 and 102 can be sanitized without requiring any additional tooling. This features allows the conveyor assembly to be quickly and easily disassembled and cleaned and reassembled without the use of external tooling.

Various alternatives and embodiments are contemplated as being within the scope of the following claims particularly pointing out and distinctly claiming the subject matter regarded as the invention.

What is claimed is:

1. A transfer tail assembly for use with a conveyor assembly having a continuous conveyor belt having an upper run and a lower run supported between a pair of spaced side frame members, each side frame member extending from a first end to a second end, the transfer tail assembly comprising:
    a pair of spaced side brackets each supported by one of the side frame members;
    a cross support removably supported between the pair of side brackets and having a longitudinal length extending transverse to the spaced side frame members;
    a plurality of support brackets spaced from each other and freely movable along the longitudinal length of the cross support; and
    a nose bar mounted to each of the support brackets and spaced from the cross support by the support brackets, the nose bar having a plurality of receiving slots each sized to receive one of the support brackets, wherein the nose bar extends past the first or second end of the side frame members such that the conveyor belt transitions between the upper run and the lower run over the nose bar.

2. The transfer tail assembly of claim 1 wherein the cross support includes at least one receiving slot sized to engage the side bracket to prevent lateral movement of the cross support between the spaced side brackets.

3. The transfer tail of claim 1 wherein each of the support brackets are formed from plastic.

4. The transfer tail assembly of claim 3 wherein each of the support brackets includes a receiving channel sized to engage one of the receiving slots formed on the nose bar, wherein the interaction between the receiving channels on the support bracket and the receiving slots on the nose bar restrict the lateral movement of the nose bar while permitting the removal of the nose bar in a direction parallel to a longitudinal axis of the conveyor assembly.

5. The transfer tail assembly of claim 1 wherein the cross support is slidably removable from the side brackets.

6. The transfer tail of claim 1 wherein the cross support extends along a longitudinal axis and has a generally square cross section, wherein each of the support brackets includes an access opening sized to permit the support brackets to be freely movable along the longitudinal axis of the cross support while preventing rotation of the support brackets about the longitudinal axis of the cross support.

7. The transfer tail assembly of claim 6 wherein the cross support has a generally square cross section and the access opening in each of the support brackets is generally square.

8. The transfer tail assembly of claim 1 wherein the pair of side brackets are movable relative to the side frame members of the conveyor assembly.

9. The transfer tail assembly of claim 1 wherein the nose bar includes a arcuate contact surface opposite the receiving slots, the contact surface being configured to contact the conveyor belt.

10. The transfer tail assembly of claim 9 wherein the nose bar is formed UHMW plastic.

11. A transfer tail assembly for use with a conveyor assembly having a continuous conveyor belt supported between a pair of spaced side frame members, the conveyor assembly extending along a longitudinal axis from a first end to a second end, the transfer tail assembly comprising:
    a pair of spaced side brackets, wherein each side bracket is mounted to one of the side frame members;
    a cross support received and supported by the pair of spaced side brackets and having a longitudinal length extending transverse to the spaced side frame members, the cross support being freely removable from the side brackets in a direction parallel to the longitudinal axis of the conveyor assembly and restricted from movement in a direction transverse to the longitudinal axis of the conveyor assembly;
    a plurality of support brackets received along the cross support, each support bracket having an access opening sized to permit the support bracket to be freely movable along the longitudinal length of the cross support while preventing rotation of the support bracket about the cross support; and
    a nose bar removably mounted to each of the support brackets and spaced from the cross support by the support brackets, the nose bar having a plurality of receiving slots each sized to receive one of the support brackets, wherein the nose bar extends past the first or second end of the side frame members such that the conveyor belt transitions between the upper run and the lower run over the nose bar.

12. The transfer tail assembly of claim 11 wherein each of the support brackets includes a receiving channel sized to engage one of the receiving slots of the nose bar, wherein the interaction between the receiving channel of the support brackets and the receiving slots of the nose bar prevent movement of the nose bar in a direction transverse to the longitudinal axis of the conveyor assembly while permitting removal of the nose bar from the support brackets in a direction parallel to the longitudinal axis of the conveyor assembly.

13. The transfer tail assembly of claim 11 wherein the nose bar includes an arcuate contact surface opposite the receiving slots, the contact surface being configured to contact the conveyor belt.

14. The transfer tail assembly of claim 13 wherein the nose bar is formed from UHMW plastic.

15. The transfer tail assembly of claim 11 wherein each of the side brackets are movable relative to the side frame members.

16. The transfer tail assembly of claim 11 wherein in the cross support member includes at least one notch sized to engage the side bracket to prevent the movement of the cross support transverse to the longitudinal axis of the conveyor assembly.

* * * * *